April 10, 1973  R. A. GIVEN  3,726,786
PROCESS FOR INTEGRATION OF EXTRACTION PROCESSING STREAMS
Filed Dec. 30, 1971
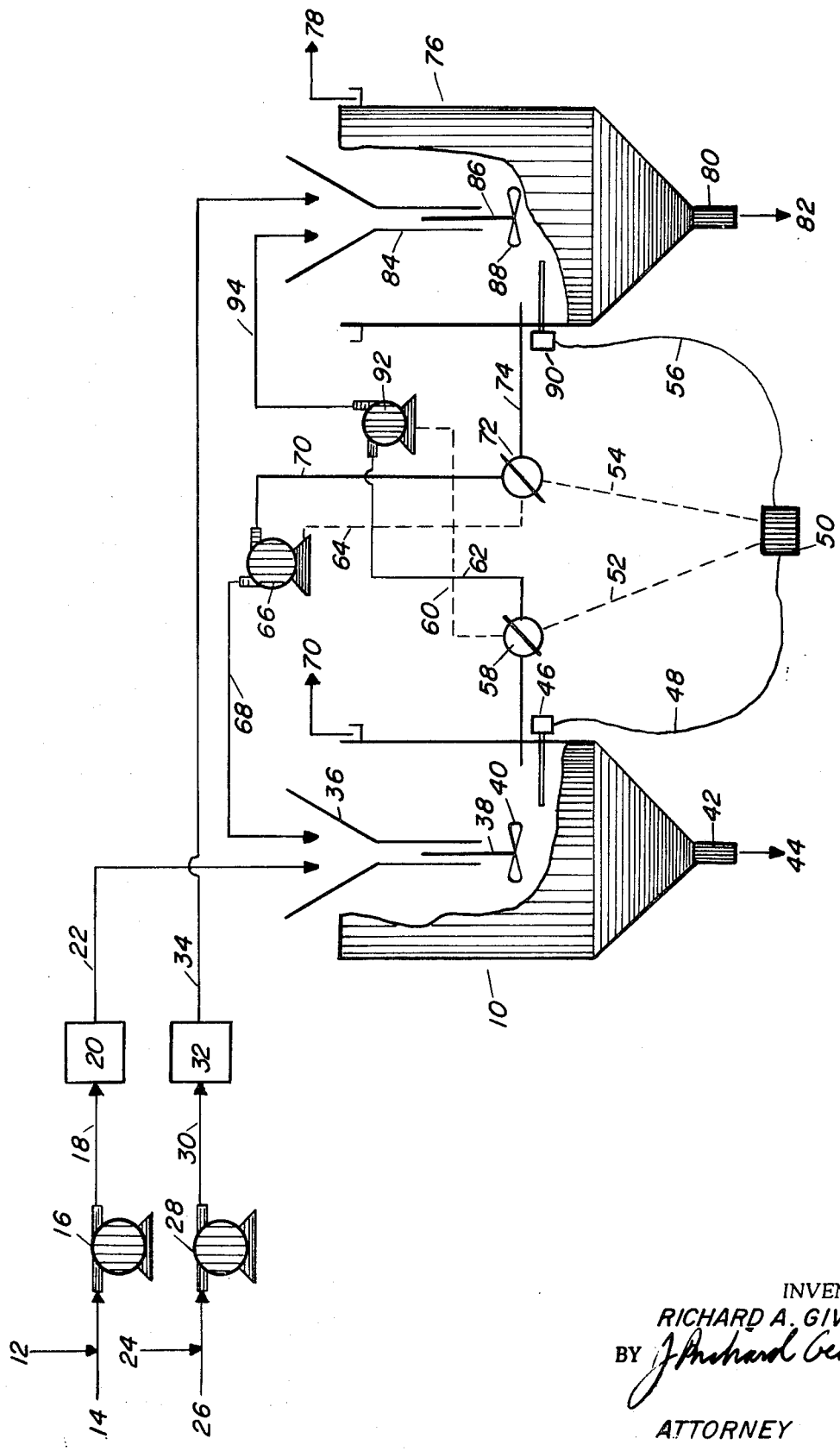
INVENTOR.
RICHARD A. GIVEN
BY *J. Richard Gearman*
ATTORNEY United States Patent Office 3,726,786
Patented Apr. 10, 1973

3,726,786
PROCESS FOR INTEGRATION OF EXTRACTION
PROCESSING STREAMS
Richard A. Given, Chatham, N.J., assignor to Canada-Cities Service, Ltd., Imperial Oil Limited, Atlantic Richfield Canada, Ltd., and Gulf Oil Canada Limited, fractional part interest to each
Filed Dec. 30, 1971, Ser. No. 213,931
Int. Cl. C10g 1/04
U.S. Cl. 208—11
2 Claims

ABSTRACT OF THE DISCLOSURE

Disclosed herein is a process wherein optimal extraction cell conditions are maintained during tar sands processing through the integration of two or more extraction processing streams. In the process, the solids unsaturated extraction streams obtained during the processing of upper tar sand beds are stirred and cross-blended for use wherein tar sands are processed from the lower tar sand beds exhibiting maximum tolerable limits of suspended solids therein the extraction streams so as to optimize water processing and heat maintenance within the tar sands extraction cell.

BACKGROUND OF THE INVENTION

The present invention involves a process for the integration of tar sands extraction processing streams for optimal extraction cell operation. More particularly, the process of the present invention involves the cross-blending of solids unsaturated extraction processing streams with extraction streams exhibiting the maximum tolerable limits of suspended solids as experienced in the processing of lower tar sand beds.

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of Alberta, Canada.

Typically, the composition of these sands by weight is: from about 5% to about 20% of oil; from about 1% to about 10% of water; and from about 70% to about 90% of inorganic solids. The specific gravity of the bitumen varies from about 1.0 to about 1.05. (The specific gravity of the bitumen as well as all other values of specific gravity given herein are taken at 60° F.) The major portion, by weight of the inorganic solids if fine grain quartz sand having a particle size greater than about 44 microns and less than 2000 microns. The remaining inorganic solid matter has a particle size of less than 44 microns and is referred to as fines. The fines contain clay and silt including some very small particles of sand. The fines content typically varies from about 5% to about 30% by weight of the solid inorganic content of bituminous sand. However, the composition of bituminous sand can vary from the above-mentioned ranges and this is not too uncommon. Also, in mining the bituminous sand, clay, which is found in layers of varying thickness in such sand areas, may be admixed with the bitumen, thus increasing the inorganic solids content and particular the fines content of the material to be processed.

Various methods have been proposed for separating bitumen from bituminous sand. The two best known methods are often referred to as the "hot water method" and the "cold water method." In the former, the bituminous sand is jetted with steam or hot water and mulled with a small proportion of water at about 175° F., and the pulp is then dropped into a turbulent stream of circulating water and carried through a separation cell maintained at an elevated temperature of about 180° F. In the separation cell, entrained air causes the oil to rise to the top in the form of a froth rich in bitumen which is then drawn off.

The so-called "cold water method" does not involve heating the bituminous sand other than whatever heating might be required to conduct the operation at room temperature. The process involves mixing the bituminous sand with water, soda ash and an organic solvent such as kerosene. The mixture is then permitted to settle at room temperature. A mixture of water and bitumen dissolved in the organic solvent rises to the top of the settling zone and is recovered.

In the operation of water separation processes of the type described above, it is desirable to obtain a bituminous froth containing maximum quantities of bitumen and minimum quantities of water and solids. Removal of water and solids from the froth is difficult and expensive. On the other hand, attempts to operate the process so as to reduce the amount of solids and water contained in the froth usually result in excessive quantities of bitumen passing from the process with waste streams, thereby reducing recovery of bitumen and increasing the pollution problem associated with waste material.

In the hot water extraction from oil of the Athabasca tar sands, recovery quality of oil is not consistent. Recoveries depend, in large, upon the type of sand being processed. Tar sand mined in some areas is easy to process when treated in a hot water extraction cell or similar types of equipment resulting in a well-defined layer of froth, middling water and sand tailings. Tar sands from other areas may be found to be interspersed with finely divided solids such as clays. In the extraction step, these finely divided solids become suspended in the middling layer of the extraction cell and continually accumulate in concentration until the dividing lines between the different layers disappear with the cell becoming inoperative. In general, the extraction cell is maintained in an operating condition by decanting some of the middling stream as a purge, removing some of the finely divided-suspended solid material and injecting a clarified water into the cell as makeup solution. As an alternate, some of the middling stream itself may be withdrawn and replaced by a fresh water makeup. In either case, considerable expense is encountered in cleaning up the water and in the latter instance, large quantities of hot water are lost in the process which also increases the costs.

What is required is a means of utilizing low solids concentration extraction processing streams from one extraction cell to cross blend with a maximum solids concentration being experienced within another extraction cell so as to optimally dilute the solids concentration in the extraction cell and allow for optimum use of water during the tar sands processing.

It is an object of the present invention to provide a process for the integration of extraction processing streams within a tar sands processing extraction cell.

It is a further object of the present invention to provide a process wherein a solids unsaturated extraction processing stream may be cross-blended within an extraction cell experiencing a maximum tolerable limit of solids suspended in the extraction processing streams contained therein.

It is still a further object of the present invention to provide a process wherein automated control of the solids concentration within the extraction processing stream of an extraction cell may be maintained through cross-blending of an unsaturated extraction processing stream from another extraction cell for optimum utilization of water during tar sands processing.

With these and other objects in mind, the present invention may be more readily understood through referral to the accompanying drawing and following discussion:

SUMMARY OF THE INVENTION

The objects of the present invention are accomplished through utilization of a process for the recovery of bitumen from tar sands of the type wherein a fluid slurry of tar sand is introduced into a separation zone containing a body of water and in which bitumen is floated to the top of the water in the form of a froth and recovered therefrom while sand is allowed to settle and be removed from the bottom of the body of water as tailing sand. The improvement of the process of the present invention comprises maintaining the concentration of solids in the extraction processing stream at a maximum tolerable operating level by removing such water as required in response to measurement of the amount of solids suspended in the water and replenishing the water removed with the extraction processing stream from an extraction processing stream of another extraction cell processing tar sands having a lower operating level of solids suspended within the water.

BRIEF DESCRIPTION OF THE DRAWING

The present invention may be more readily understood by referral to the accompanying figure in which an arrangement of apparatus for the utilization in the process of the present invention for integration of extraction processing streams to derive optimum extraction cell processing of tar sands is depicted.

DETAILED DESCRIPTION OF THE INVENTION

The present invention involves the integration of extraction processing streams obtained when processing tar sands from areas exhibiting low fines concentrations, for example, from upper tar sands beds with extraction processing streams obtained when processing tar sands from areas of high fines, for example, from lower tar sands beds, while efficiently maintaining the extraction cell operating conditions at a minimal expense. The maximum amount of suspended solids in the extraction processing stream which an extraction cell can tolerate and efficiently operate the cell is an easily determinable variable. Generally, the fines concentration of from about 13 to about 17 volume percent is preferred with the concentration preferably held at about 15 volume percent. In accordance with the process of the present invention for recovery of bitumen from tar sands in a water extraction cell, the process comprises measuring the suspended solids level in the extraction processing stream of the several extraction cells. In accordance to the determination of an unsaturated concentration of solids in comparison with the maximum tolerable solids concentration for efficient bitumen extraction, the extraction processing streams are cross-blended with other extraction processing streams to provide the maximum tolerable saturation solids for efficient bitumen extraction.

The particular operation of the process of the present invention may be more readily understood by referral to the accompanying figure. A first extraction cell 10 is depicted having a draft tube 36 contained therein. A rotation arm 38 is connected to a stirrer 40 and extended within the draft tube 36. Tar sands 26 and extraction water 24 are introduced into the first extraction cell 10 through pump 28 and line 30 feeding mixer 32. The effluent from mixer 32 is directly fed to first extraction cell 10 through line 22. The arrangement allows maximum concentration of tar sands introduced into the extraction cell 10 with the extraction processing stream present in the extraction cell 10. The separated solids 44 are removed through exit 42 located in the lower portion of the extraction cell 10. The removal of froth 70, containing the bitumen, from the extraction cell 10, is provided by decanting. The solids density within the extraction cell 10 may be measured through density sensing probe 46 electrically connected by line 48 to a density meter 50 so as to activate simultaneously through electrical connection 52 the pump 92 and valve control apparatus 58. The density meter 50 activates extraction processing stream removal pump 92 removing extraction processing stream 62 from the extraction cell 10. The particular density sensed by density sensing probe 46 determines what quantities of extraction processing stream the control valve 58 will allow through pump 92, depending upon whether or not the density of the extraction processing stream is at the maximum tolerable level for efficient operation of the extraction cell 10.

The extraction processing stream 94 is introduced into a second extraction cell 76 through a draft tube 84 having a rotation arm 86 and stirrer 88. Solids 82 are removed from the second extraction cell 76 through exit 80 located in the lower portion thereof. A density sensing probe 90 determines the solids concentration within the extraction processing stream if it is less or greater than the tolerable solids concentration through electrical line 56 to density meter 50. The extraction processing stream may be passed to the first extraction cell 10 for immediate use as makeup water within the extraction cell 10 through fluid line 74 controlled by valve 72 and pump 66 connected by lines 70 and 68 to draft tube 36. Froth 78 is decanted from the upper portion of the second extraction cell 76. Therefore, simultaneously with the removal of the extraction processing stream 74 from extraction cell 76, the control apparatus activates removal of extraction processing stream 62 from extraction cell 10 as determined by particular levels and concentration of the solids within cells 10 and 76. Make-up waters 12 and 14 may be required to adjust the solids concentrations of the extraction processing streams to the desired solids volume concentration of about 15%.

Therefore, the maximum amount of suspended solids in the extraction processing stream which the extraction zone can tolerate and still operate efficiently is determined in accordance with the process of the present invention. Portions of the extraction processing streams are withdrawn from one or more extraction cells in processing tar sands from areas which yield multivariant concentrations of suspended solids concentration and are cross-blended to obtain the desired concentration levels for operation. When processing tar sands from a lower bed which produces an extraction processing stream containing suspended solids in excess of a tolerable quantity, a portion of extraction processing stream is commingled with a portion of an extraction processing stream from an upper tar sands bed having a low solids concentration in order to balance the solids concentrations within the extraction processing streams. When the supply of the two or more streams has been cross-blended, the process can be integrated and made self-sustaining. Extraction processing streams of low solids concentrations are returned in appropriate volumes to those of the high solids content removed from other extraction cells. During those periods when the extraction processing streams are all low in solids content, the cross flow is curtailed and straight run processing is accomplished. By utilizing a continuous solids concentration sensing device such as a density meter depicted in the accompanying figure to control the various pumps and valves, the process may be automatically controlled at predetermined ranges of solids contents in the extraction processing streams and extraction cells.

Therefore, the process of the present invention provides an improved system for optimum use of extraction processing streams water within extraction cells for the processing of tar sands. The process provides a means wherein tar sands mined in areas in which the tar sands fines concentration is radically changed may be used to the advantage of the tar sands processing in order to provide an efficient and operable process for the efficient utilization of aid of waters in the tar sands bitumen recovery project.

While the invention has been described above with respect to certain embodiments thereof, it will be understood by those skilled in the art that various changes and modifications may be made without departing from the spirit and scope of the invention as set forth herein.

Therefore, I claim:

1. In a process for the recovery of bitumen from bituminous sand in which a fluid slurry of bituminous sand is introduced into a first extraction cell containing a body of water and in which bitumen is floated to the top of the water in the form of a froth and recovered while sand is allowed to settle to the bottom of the body of water and removed, the improvement which comprises maintaining the concentration of solids in the body of water at less than the maximum tolerable operating level by removing such water as required in response to measurements of the suspended solids content in the water and replenishing the water removed with water removed from a second extraction cell having a lower operating level of solids suspended within the water.

2. A process for recovery of bitumen from bituminous sand in several extraction cells, which comprises:
 (a) measuring the suspended solids level in each of the extraction processing streams of the extraction cells; and
 (b) cross-blending the extraction processing streams according to the solids concentrations measured in comparison with the maximum tolerable solids concentration for efficient bitumen extraction.

References Cited

UNITED STATES PATENTS

| | | | |
|---|---|---|---|
| 3,068,167 | 11/1962 | White | 208—11 |
| 3,070,541 | 12/1962 | Price | 208—11 |
| 3,605,975 | 9/1971 | Brimhall | 208—11 |

CURTIS R. DAVIS, Primary Examiner